United States Patent [19]
Facq et al.

[11] Patent Number: 6,016,520
[45] Date of Patent: Jan. 18, 2000

[54] METHOD OF VIEWING AT A CLIENT VIEWING STATION A MULTIPLE MEDIA TITLE STORED AT A SERVER AND CONTAINING A PLURALITY OF TOPICS UTILIZING ANTICIPATORY CACHING

[75] Inventors: Jean-Remy Facq, Bellevue; Lindsay A. Harris, Bothell, both of Wash.

[73] Assignee: Microsoft Corporation, Redmond, Wash.

[21] Appl. No.: 08/502,727

[22] Filed: Jul. 14, 1995

[51] Int. Cl.⁷ .................................................. G06F 13/14
[52] U.S. Cl. ........................... 710/33; 709/203; 709/216; 709/217; 709/219
[58] Field of Search ........................... 395/161, 154, 395/200.09, 600, 659; 320/94.2, 118; 364/283.1; 709/203, 219, 216, 217; 710/1, 33

[56] References Cited

U.S. PATENT DOCUMENTS

| | | | |
|---|---|---|---|
| 5,091,849 | 2/1992 | Davis et al. | 395/100 |
| 5,150,472 | 9/1992 | Blank et al. | 395/425 |
| 5,241,671 | 8/1993 | Reed et al. | 395/600 |
| 5,276,679 | 1/1994 | McKay et al. | 370/84 |
| 5,305,195 | 4/1994 | Murphy | 705/1 |
| 5,305,389 | 4/1994 | Palmer | 382/1 |
| 5,317,732 | 5/1994 | Gerlach, Jr. et al. | 395/600 |
| 5,347,632 | 9/1994 | Filepp et al. | 709/202 |
| 5,351,276 | 9/1994 | Doll, Jr. et al. | 379/88.17 |
| 5,442,749 | 8/1995 | Northcutt et al. | 395/200.09 |
| 5,446,740 | 8/1995 | Yien et al. | 709/247 |
| 5,491,820 | 2/1996 | Belove et al. | 707/3 |
| 5,493,677 | 2/1996 | Balogh et al. | 707/104 |
| 5,499,330 | 3/1996 | Lucas et al. | 707/514 |
| 5,528,739 | 6/1996 | Lucas et al. | 707/526 |
| 5,530,852 | 6/1996 | Meske, Jr. et al. | 709/206 |
| 5,537,526 | 7/1996 | Anderson et al. | 707/515 |
| 5,539,886 | 7/1996 | Aldred et al. | 395/200.04 |
| 5,544,051 | 8/1996 | Senn et al. | 707/3 |
| 5,557,515 | 9/1996 | Abbruzese et al. | 364/401 R |
| 5,572,643 | 11/1996 | Judson | 709/218 |
| 5,577,042 | 11/1996 | McGraw, Sr. et al. | 370/85.7 |
| 5,621,874 | 4/1997 | Lucas et al. | 707/500 |
| 5,623,652 | 4/1997 | Vora et al. | 707/10 |
| 5,625,818 | 4/1997 | Zarmer et al. | 707/104 |
| 5,649,186 | 7/1997 | Ferguson | 707/10 |
| 5,659,729 | 8/1997 | Nielsen | 707/3 |
| 5,717,914 | 2/1998 | Husick et al. | 395/603 |
| 5,778,372 | 7/1998 | Cordell et al. | 707/100 |
| 5,802,292 | 9/1998 | Mogul | 395/200.03 |

FOREIGN PATENT DOCUMENTS

| | | |
|---|---|---|
| 0749081A1 | 6/1995 | European Pat. Off. . |
| WO96/30864 | 10/1996 | WIPO . |

Primary Examiner—Thomas C. Lee
Assistant Examiner—Abdelmoniem Elamin
Attorney, Agent, or Firm—Klarquist Sparkman Campbell Leigh & Whinston, LLP

[57] ABSTRACT

An on-line multiple media viewer system provides a responsive interactive presentation at a client viewing station of multiple media content retrieved over a remote connection from a server at which the content resides using a set of client-initiated and server-driven remote services for anticipatory caching of media content. In response to an initial request for an item of media content from the server, the remote services predict additional items of media content likely to be requested and transmit these items in advance of their request. Transmitted items are cached by services at the client viewing station in a cache storage. The client checks the cache storage before making additional requests for transfer over the remote connection. The items are transmitted in multi-channel asynchronous operations over the remote connection.

37 Claims, 4 Drawing Sheets

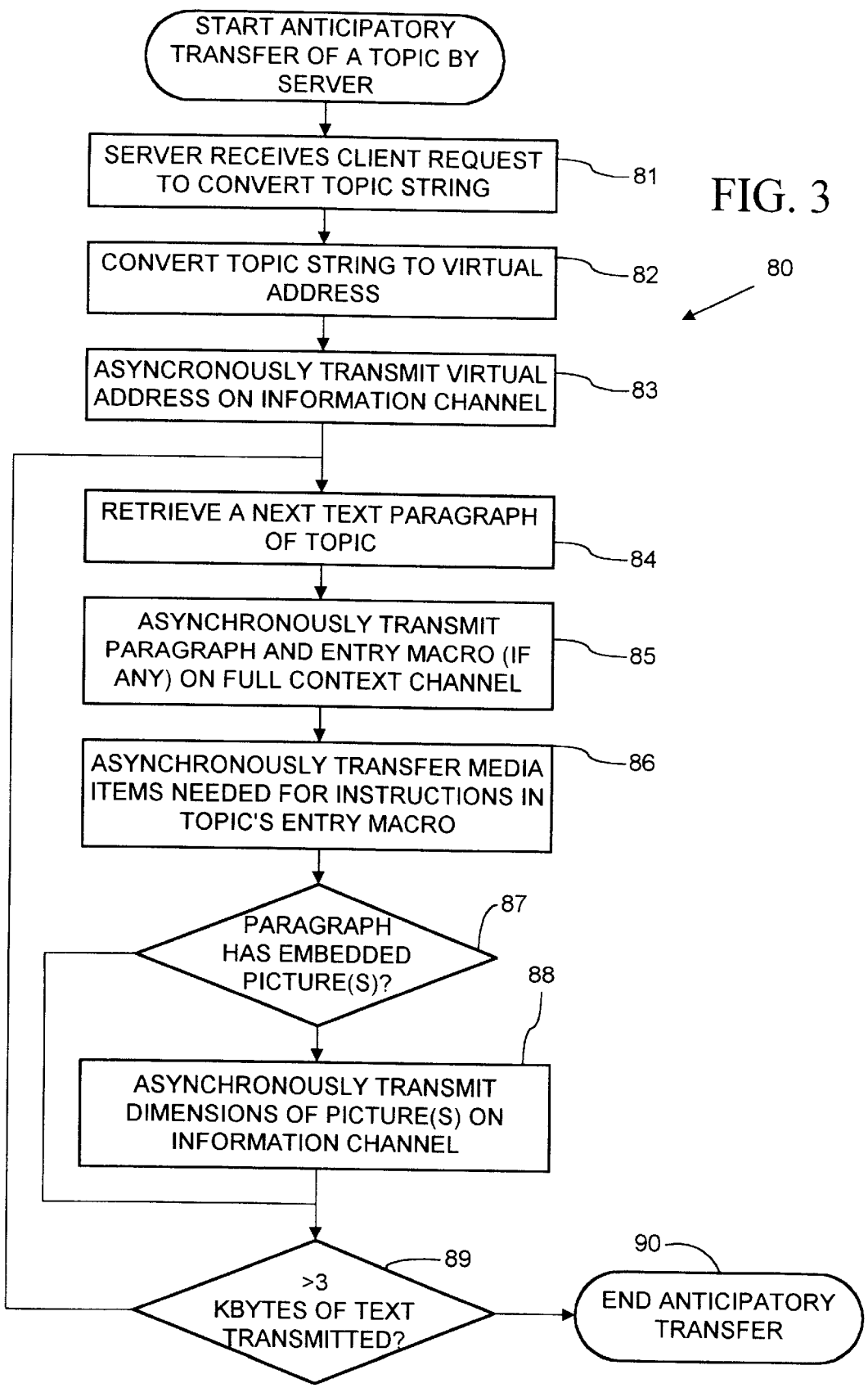

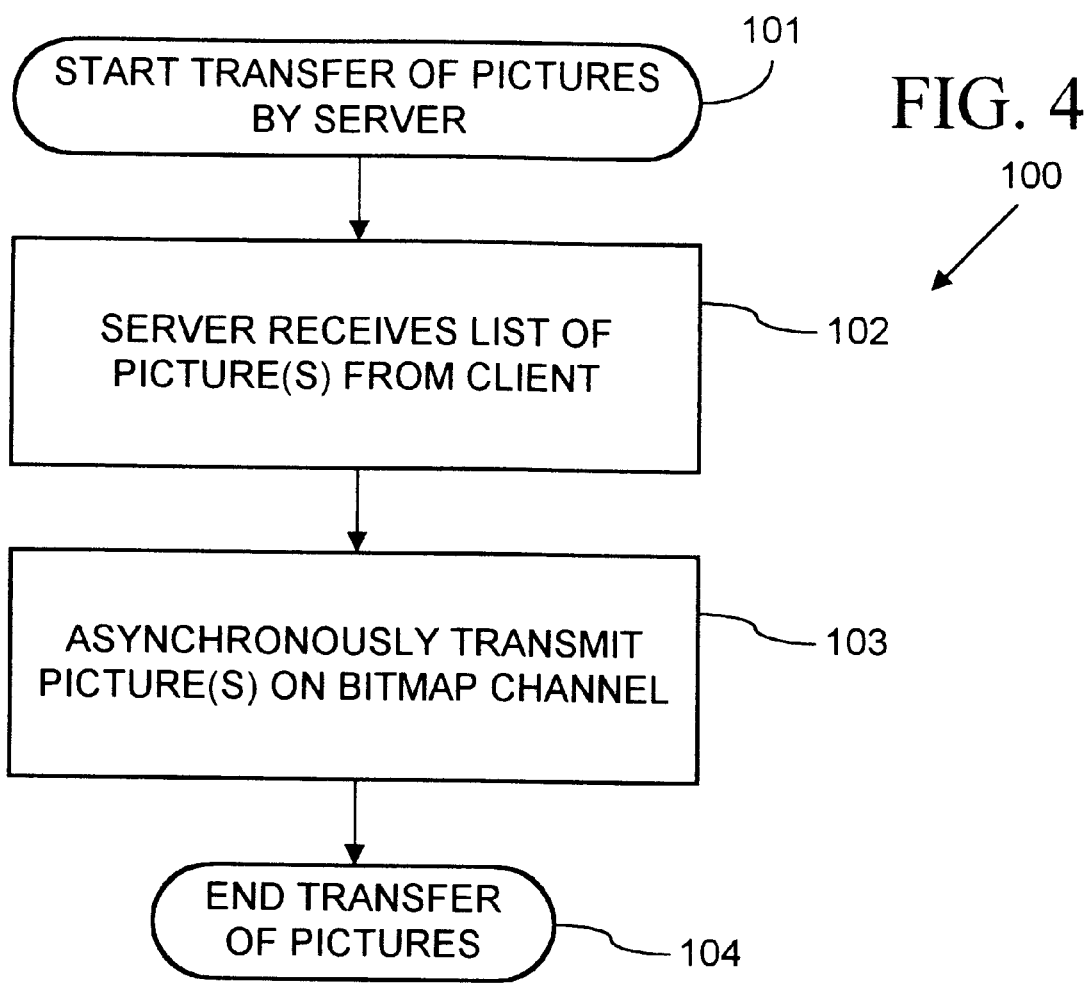

METHOD OF VIEWING AT A CLIENT VIEWING STATION A MULTIPLE MEDIA TITLE STORED AT A SERVER AND CONTAINING A PLURALITY OF TOPICS UTILIZING ANTICIPATORY CACHING

FIELD OF THE INVENTION

The present invention relates generally to systems for retrieving and displaying information content including multiple media from a remote on-line database, and more particularly relates to systems for efficiently transferring multiple media content on a communications medium for interactive viewing.

BACKGROUND OF THE INVENTION

Multiple media content, including for example, textual, graphical or pictorial, video, and audio information items and combinations thereof, can be viewed interactively by a user with computer applications referred to herein as multiple media viewers. In addition to displaying, playing or otherwise presenting various related media, these multiple media viewers generally provide tools for the user to browse and search through information presented in the multiple media content.

In prior art multiple media viewers, the multiple media content typically is stored on a CD-ROM which is inserted into a CD-ROM drive on the user's computer for access by the viewer. Examples include, among others, Microsoft Corporation's Multimedia Viewer version 2.0 multiple media viewer, and Microsoft Corporation's Encarta®, Cinemania®, Dinosaurs®, and Baseball 1995® CD-ROM multiple media titles (which incorporate a CD-ROM based multiple media viewer). The CD-ROM generally provides sufficient storage for a single multiple media title. More importantly, the transmission bandwidth of current CD-ROM drives is sufficient to provide near instantaneous or on-demand rendering of the multiple media content responsive to user input.

Some prior art multiple media viewers connect via a modem and telephone line (or wireless telephone service) to an on-line service provider to access multiple media content which is resident on a remote central computer (hereafter "server"). Examples include the front-end or user applications for the major on-line service providers such as Compuserve, America On-Line, and Prodigy, as well as Mosaic and other internet world-wide-web browsers. Such on-line delivery of multiple media content has the advantage of potentially lowering the cost of distribution of the information (e.g., by avoiding the costs of reproducing, distributing, and retailing CD-ROMs for multiple media titles). Further, the on-line service provider can provide access for its subscribers to a large number (e.g., hundreds or even thousands) of multiple media titles.

The drawback to on-line multiple media viewers is that the modem connection to the on-line service provider has a much lower data transmission rate (on the order of 1 KByte/s for a 9600 baud/s modem) compared to CD-ROM drives (typical quad-speed CD-ROM drives have a data transfer rate of about 600 Kbyte/s). Even further, modem connections to an on-line service provider suffer long latencies (e.g., 0.5–2 seconds is common) between an initial request for data and its reception due to multiple layers of transmission protocols for packetizing and routing data through the on-line service provider's network and for signal propagation between the client and server. This results in a long delay between a request initiated by a user input for a particular media item (e.g., a text, image, or sound) in a multiple media title at the server, and the availability of the media item for rendering by the viewer application at the user's computer.

In general, prior on-line multiple media viewers are client-driven. The on-line multiple media viewer application running on the user's computer (referred to as the "client") controls all data transfers from the server. Typically, each media item is requested synchronously as a separate file download by the client viewer. The client viewer waits for each requested media item transfer to complete before requesting a subsequent media item. Prior on-line multiple media viewers may perform several of these synchronous transfers before rendering any part of a presentation involving multiple media items. Consequently, rendering of the presentation may be delayed by the latency of several transfer requests and the duration of several file transfers after the user's activating input. Where graphical or pictorial, video, or audio media items are involved, the delay before rendering of a presentation or even parts thereof can be tens of seconds or minutes. Prior on-line multiple media viewers therefore have lacked sufficient speed and responsiveness for effective interactive viewing and browsing of multiple media content.

A purpose of the invention therefore is to enable the viewing of multiple media titles over on-line connections with a remote server, including current slow on-line connections.

SUMMARY OF THE INVENTION

The present invention provides an on-line multiple media viewer system and method that achieves responsive viewing of multiple media titles using client-initiated and server-driven transfer of media items (including without limitation textual, graphical, pictorial, video or audio information and layout or presentation information) contained in the titles.

In the multiple media viewer system, content of the multiple media titles resides on a server. A client that is remotely connected to the server runs a multiple media viewer that responds to user input to present to a user content from the multiple media titles retrieved from the server. After the client initially requests a media item responsive to the user input, the server predicts which subsequent media items are likely to be requested next by the client based on the multiple media title's content. The server then transmits the predicted subsequent media items in addition to the media item initially requested by the client. On receipt by the client, the predicted subsequent media items are cached. For each media item which is to be retrieved from the server, the client first checks whether the media item has been cached. If the media item already is cached or is already being transferred from the server, the system avoids the delay due to the latency of the request and also possibly the time for transfer of the media item.

According to a further feature of the invention, the server provides interfaces for calling by the client to prefetch or retrieve media items that the client may later otherwise request.

According to an additional feature of the invention, the server transfers media items asynchronously on a multiple channel on-line connection. With asynchronous transfer operations, the client can continue processing the viewing of multiple media content while periodically polling for completion of a requested transfer rather than suspending processing while waiting for synchronous transfers to complete. With multiple channels, the client can transfer critical layout and presentation information needed for a layout while concurrently transferring larger media items such as pictorial or sound information.

Additional features and advantages of the invention will be made apparent from the following detailed description of a preferred embodiment which proceeds with reference to the accompanying drawings.

BRIEF DESCRIPTION OF THE DRAWINGS

FIGS. 3 and 4 are flow diagrams of a processes performed in the datacenter server of FIG. 2 for anticipatory transfer of multiple media content to the client viewing station.

DETAILED DESCRIPTION OF THE PREFERRED EMBODIMENTS

Figure 1:
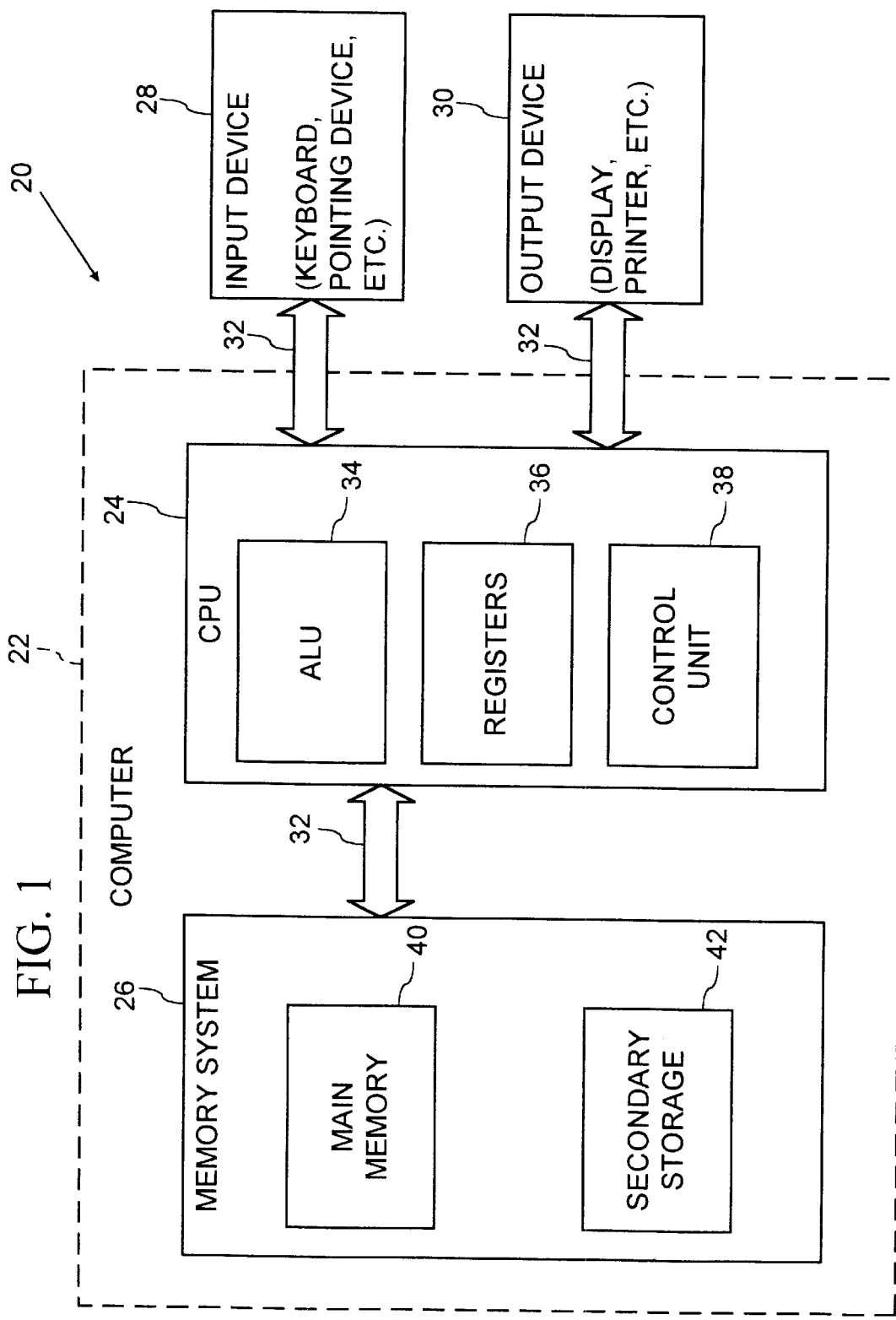
FIG. 1 is a block diagram of a computer system that may be used to implement a method and apparatus embodying the invention.

Referring to FIG. 1, an operating environment for a preferred embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The preferred realization of the CPU 28 is a Pentium processor manufactured by Intel (or other x86 family or compatible processor), but a variety of other suitable processors, including those from Digital Equipment, Sun, MIPS, Motorola, etc., can alternatively be used.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g. a microphone), etc. The output device 30 can comprise a display, a printer, a transducer (e.g. a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to symbolic representations of operations that are performed by the computer system 20. Such operations are sometimes referred to as being computer-executed. It will be appreciated that the operations which are symbolically represented include the manipulation by the CPU 24 of electrical signals representing data bits and the maintenance of data bits at memory locations in the memory system 26, as well as other processing of signals. The memory locations where data bits are maintained are physical locations that have particular electrical, magnetic, or optical properties corresponding to the data bits. The invention can be implemented in a program or programs, comprising a series of instructions stored on a computer-readable medium. The computer-readable medium can be any of the devices, or a combination of the devices, described above in connection with the memory system 26.

Overview of Multiple Media Viewing System

Figure 2:
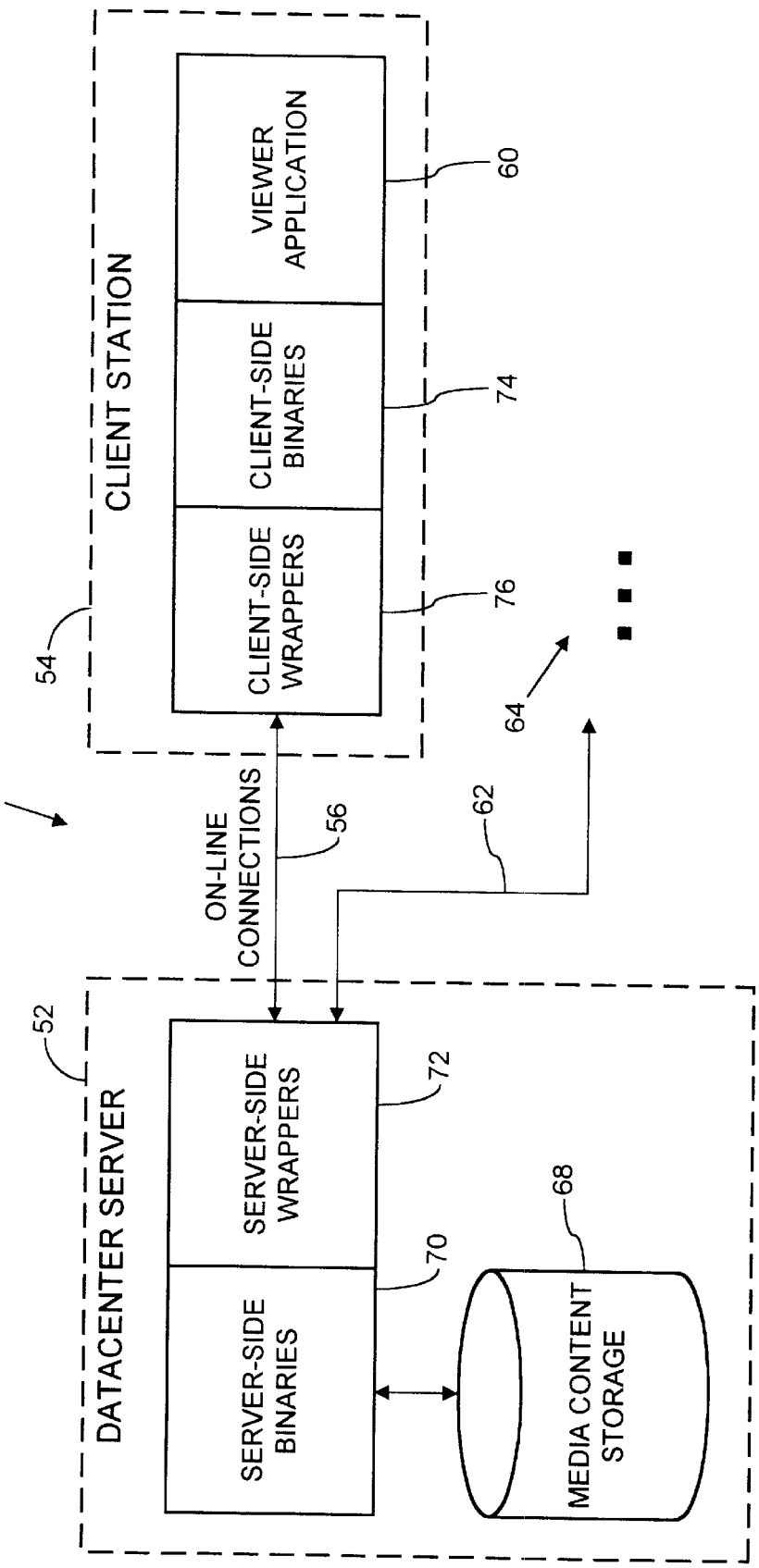
FIG. 2 is a block diagram of an on-line multiple media viewing system comprising a data center server and multiple media content database and one or more client viewing stations according to a preferred embodiment of the invention.

With reference to FIG. 2, a multimedia viewing system 50 according to a preferred embodiment of the invention comprises a data center server 52 and a client viewing station 54 having an on-line connection 56 to the server 52. The data center server 52 preferably is realized with one or more computers such as the computer 20 illustrated in FIG. 1, at least one of which is adapted for use as a file server of a wide-area, distributed computer network. The data center server 52 preferably runs a multi-tasking, network capable operating system software, such as Microsoft Corporation's Windows NT operating system.

The client viewing station 54 preferably is a computer such as the computer 20 illustrated in FIG. 1 which is adapted for use as a work station or home personal computer. The client viewing station 54 preferably runs a multiple media viewer application 60 on a multi-tasking operating system platform such as Microsoft Corporation's Windows 95 operating system. The client viewing station 54 preferably also has a communications software which provides communication with the data center server 52, and which may be integrated in the operating system or the viewer application 60 or which may be a separate application software.

The on-line connection 56 between the client viewing station 54 and the data center server 52 can be a conventional modem-to-modem connection on a conventional telephone line (i.e., a "POTS" or "plain old telephone system" line). The data center server 52 preferably includes a modem for this purpose as one of its output devices 30, which may be connected directly to the server's system bus or resident in a communications server connected to the data center server 52 via a local area network. The data center server 52 can include a plurality of modems for additional on-line connections 62 to additional client viewing stations 64. The client viewing station 54 likewise preferably includes a modem for the on-line connection 56 as one of its output devices 30, which is compatible with that of the data center server. Modems manufactured by US Robotics, Practical Peripherals, Intel and others are suitable for use in the on-line connection 56. The on-line connection 56 also can be suitably realized using other known or to be developed communications technologies of comparable or higher transmission speeds for remotely connecting and communicating data between computers. Examples of these technologies include wireless communications systems including radio and satellite-based systems, cable systems including co-axial and optical fiber cable systems, and telephone systems including digital telephone lines (e.g., "ISDN") and cellular.

The on-line connection 56 in the preferred embodiment includes a transport layer which is realized in software. The transport layer includes code for packetizing and routing of data being transmitted on the on-line connection 56 between the data center server 52 and the client viewing station 54. The data which is packetized or divided into packets can be routed in any order between the server 52 and station 54 where the packets are re-assembled into the original data. The packets of multiple data items can be mixed or interleaved, and routed concurrently together through the single on-line connection 56. The transport layer separates the packets for each data item at the receiving end of the on-line connection 56 and re-assembles the packets into the original data items. Accordingly, although data is transmitted in a sequential bit-stream through the on-line connection, the transport layer is able to separately channel multiple data items through the on-line connection in a concurrent manner. Microsoft Corporation's Marvel Procedural Code ("MPC") is utilized as the transport layer in the preferred embodiment. Other transport layer software and data packetizing and routing techniques are known and can suitably be used in alternative embodiments of the invention.

The data center server 52 further includes a fast access, high capacity mass storage device 68 (such as a disk array which may be a redundant array of inexpensive disks ("RAID") type device) in its secondary storage 42. The storage device 68 stores one or more multiple media titles that are to be made remotely available to the client viewing stations 54, 64 for viewing by a user. The multiple media titles are digital documents or data which comprise a plurality of items of various different media, including textual items, graphical or pictorial image items, video items, sound items, etc. In the preferred embodiment, the titles conform to the format (hereafter "Mediaview format") of titles written or compiled for Microsoft Corporation's Multimedia Viewer version 2.0 (a prior CD-ROM based multiple media viewer). This format is described in "Microsoft Multimedia Viewer Publishing Toolkit Technical Reference," Microsoft Corporation (1993); and in "Microsoft Multimedia Viewer Publishing Toolkit Authoring Guide," Microsoft Corporation (1993). Other formats of multiple media titles can be suitably used in alternative embodiments of the invention.

According to the Mediaview format, each multiple media title is organized as a plurality of topics. The topics are referenced or identified in the multiple media viewing system 50 by a character string uniquely associated with the topic, an "ADDR" address which identifies its location in a Mediaview file in the storage device 68, and a virtual address identifying the location where the topic resides when realized in memory during run time. Each topic contains one or more textual items having the form of paragraphs of text and format information. Because they contain format information, textual items in the preferred embodiment constitute layout atomes (also referred to as a full context) which determine the layout of media items presented by the client viewing station 52. Each textual item can contain embedded references to one or more picture items, which are in the form of compressed bitmaps. The topics also may include an on-entry macro which contains instructions for the viewer application 60 that are to be executed on entry into the topic. The topics also contain hot-spot items which define links or jumps between a portion of a picture or text element and another topic. Multiple media titles additionally may include specialized data referred to as word wheels which comprise a list of word items. Mediaview titles include a word wheel containing the names of all the topics in the title by default, and also may include word wheels that are defined by the title's author. (All the various items associated with a topic including topic addresses, textual items, and picture items, as well as data or information items relating to their layout or presentation by the viewer application 60 are referred to collectively herein as "media items.")

The viewer application 60 presents the media items associated with the topics in a title as a set of screens and associated sound (if any) on the output devices 30 (i.e., display devices such as a CRT or LCD screen and a sound system) of the client viewing station 54 utilizing conventional techniques, such as those implemented in Microsoft Corporation's Multimedia Viewer version 2.0 CD-ROM based multiple media viewer. In general, the viewer application 60 partitions a client area of the screen (e.g. a window associated with the application in the Windows '95 operating system) into rectangular regions referred to as "panes" in a manner defined by the title. In each pane, the viewer application 60 presents the text and picture items of a separate topic of the title. A main pane includes a scroll bar control which the user can activate to move through the text and picture items of the topic in sequence. Secondary panes in the client area do not include a scroll bar and are generally used to present text and picture items of topics to supplement the items of the topic presented in the main pane or to simply provide decoration around the main pane. The viewer application 60 additionally may present a portion of a word wheel in a subwindow.

The viewer application 60 generally changes the topic displayed in the panes in response to selection by the user of a hot-spot defined in a portion of the presented text and picture items, such as by activation with a "mouse" pointing device. Activation of the hot-spot causes a "jump" to another topic in a pane as defined by the title. The on-entry macro of the topic to which the viewer application jumps in response to the activation of the hot-spot may contain instructions which cause further jumps to other additional topics in the secondary panes.

The multiple media viewing system 50 further comprises a set of server-side binaries 70 and server-side wrappers 72 and a set of client-side binaries 74 and client-side wrappers 76 for transferring media items of the title from the storage 68 at the data center server 52 to the viewer application 60 at the client viewing station according to the preferred embodiment of the invention. The binaries 70, 74 and wrappers 72, 76 preferably are implemented as modules of code for a set of related functions. The server-side binaries 70 implement an application programming interface ("API") or set of services that can be called by the viewer application 60. The client-side binaries 74 implement a set of services that can be called by the server-side binaries 70. The wrappers 76, 72 respectively implement remote API calls to the services in the server-side binaries 70 from the client viewing station 54 and remote API calls to the client-side binaries 74 from the data center server 52 across the on-line connection 56. To make the API calls over the on-line connection 56, the wrappers 72, 76 translate the API calls into linear buffers and manage local versus remote address space issues by substituting local proxies for memory allocated on the opposite (client or server) side as is known in the art.

Operation of the Multiple Media Viewing System

The server-side binaries 70 and wrappers 72 include services which the viewer application 60 calls to request transfer of media items contained in a selected topic of a title and data relating to the selected topic from the storage device 68 to the client viewing station 54. Data exchanges between the data center server 52 and the client viewing station 54 take the form of synchronous and asynchronous operations. In a synchronous operation, the viewer application 60 requests transfer of a media item from the server 52, then waits until the requested transfer is complete before continuing. An example of a synchronous operation in the multiple media viewing system 50 is the initial opening of a multiple media title by the viewer application 60. In this situation, the viewer application 60 is unable to continue because no other operation on the title can be performed until the title is actually opened.

In an asynchronous operation, the viewer application 60 calls with a request for a media item from the data center server 52, and polls for completion of the transfer while continuing with other tasks such as laying out or rendering another portion of a pane not dependent on the requested item. Such asynchronous operations are handled by a background task or thread of execution that executes the client-side binaries 76 and is separate from the task or thread executing the viewer application 60. Transfers from the data center server 52 therefore can take place without tying up execution of the viewer application 60, and can even take place prior to a request from the viewer application 60 for the item being transferred. Accordingly, the viewer application 60 is freed to progressively render portions of media items as they arrive at the client viewing station 54.

The multiple media viewer system 50 further utilizes asynchronous transfer operations to anticipatorily transfer media items likely to be needed by the viewer application 60 before they are requested by the viewer application 60. The latency and transmission delays of the on-line connection 56 thus are accommodated transparently to the user, resulting in a substantial increase in the responsiveness of the viewer application to user input.

For implementing asynchronous transfer operations, the client-side binaries 74 include services to cache data being transferred from the data center server 52 in a cache storage which may be memory allocated out of the main memory 40 of the client viewing station 54 or a file in the secondary storage 42 of the client viewing station. The client-side binaries 76 further include services for polling the cache storage by the viewer application 60 for the presence of needed media items.

The server-side binaries 70, on the other hand, include services to anticipate which media items are likely to be requested by the viewer application 60, and transfer these items before they are requested by the viewer application 60. In general, these service rely on the relationships between media items contained in the multiple media title and on the manner or order in which the viewer application 60 requests transfer of the items in a title to predict which items are likely to be requested next by the viewer application. As a result, the cache storage at the client viewing station 54 gets filled in advance so that when the viewer application 60 needs a media item, the item is already present in the cache storage most of the time.

In general, transfer operations between the data center server 52 and the client viewing station 54 proceed in the following succession: (1) the viewer application 60 "tips" the server-side binaries 70 as to its current activities such as with a call requesting a media item; (2) the server-side binaries 70 predict which media items will be requested next by the viewer application 60 and transfers the items to the client viewing station 54; and (3) the client-side binaries 74 cache the transferred items and respond to polls by the viewer application 60 checking for the presence of the items. Typically, the initial request by the viewer application is effectively a synchronous transfer operation resulting from the user initiating some random activity. For example, at any particular time in the presentation of the title, multiple hot spots which trigger jumps to various different topics may be available on the screen for activation by the user. The user may choose to activate any one of the hot spots causing a jump to a different one of the topics in the title. However, based on the initial request, the server-side binaries are able to predict which media items are likely to be requested next by the viewer application 60 from the structure of the selected topic and the normal procedure of the viewer application for rendering the media items of a topic in the title (although a further random action of the user may cause the viewer application 60 to switch to a different activity).

Multiple Channel Transmission

In the preferred embodiment, the server-side binaries 70 and the client-side binaries 74 cooperate to transfer media items through multiple separate channels over the on-line connection 56. This allows multiple media items to be transmitted concurrently over the on-line connection 56, and helps prevent transfers of larger sized media items (e.g., bitmaps of image items) from blocking transfer of critical smaller sized media items. For example, a request from the client viewing station 54 for transfer of a particular item can be handled by the datacenter server 52 while in the middle of an anticipatory transfer of a media item.

In the preferred embodiment, the media items are transmitted through five channels including a bitmap channel, a full context channel, a wordwheel channel, a highlights channel, and an information channel. In the bitmap channel, the server-side binaries 70 transmit larger items including image items (e.g., bitmaps, metafiles), sound items, and so forth. The client viewing station 54 spins a separate thread of execution in the client-side binaries 70 for dispatching these items received through the bitmap channel, while a main thread attends to user input at the client viewing station 54. The remaining channels are not monitored by a separate thread on the client viewing station 54. The full context channel carries the textual and like full context items. The word wheel channel carries word wheel items. The highlights channel carries items conveying information of the results of a search on the title. The information channel passes small, high priority items such as topic addresses, and dimensions of image items (e.g., bitmaps). The following Table 1 is a listing of a class which defines these channels in the preferred embodiment of the invention.

TABLE 1

Multiple Channel Class Listing.

```
// class to manipulate asynchronous channels
class CAsyncChannel
{
// This function is used to create the background thread
// which will automatically process the data arriving in
// the channel.
friend DWORD MonitorAsync(LPVOID lpThreadParameter) ;
protected:
    // Unique byte identifying the channel.
    // It is passed to server upon creation of the
    // channel.
    BYTE bChannel ;
    // This flag tells us if channel is locked or not.
    // We use it to avoid unnecessary lock/unlocks once
    // the channel is in the state we want. This locking
    // mechanism is used for bitmaps.
    DWORD m_fFlags ;
```

TABLE 1-continued

Multiple Channel Class Listing.

```
    // This function will be called to process the data
    // in the channel It's type is defined as follows
    // typedef DWORD (*CHANNEL_HANDLER) (LPBYTE,
    // DWORD, LPVOID) ; It is given the address and size of the
    // new data, along lpHandlerData.
    CHANNEL_HANDLER pfDefaultHandler ;
    // This private pointer is passed as an argument of
    // pfDefaultHandler to allow the handler to access
    // additional information about the channel (like
    // its cache).
    LPVOID lpHandlerData ;
    // A status object in which the data arrives.
    IMosStatus *pms ;
    // The amount of data already read from pms.
    DWORD dwRead ;
    // This Event is set to let the channel's monitoring
    // thread know when to restart after a cancel.
    HANDLE hEventRestart ;
    // The handle and ID to thread (if any) that
    // monitors the channel and calls pfDefaultHandler
    // when there is data.
    HANDLE hThread ;
    DWORD dwThreadID ;
    // Set to true when thread monitoring has to stop.
    BOOL fExitThread ;
    // This event is set by the monitoring thread when
    // data was found.
    HANDLE hEventData ;
    // This flag is TRUE if is ok to wait for data,
    // otherwise the channel needs to be restarted.
    BOOL fChannelOK ;
    // These 2 values are updated based on what was
    // processed the channel Number of current element
    // processed by the handler.
    DWORD dwCurrentElt ;
    // Current element before last call to waitfordata.
    DWORD dwLastUsedElt ;
public:
    // Creates the channel.
    CAsyncChannel (BYTE b, CHANNEL_HANDLER pfHandler,
BOOL fThreadMonitor = TRUE, BOOL fStartOpen = TRUE,
LPVOID ipData = NULL) ;
    // Destroys the channel.
    ~CAsyncChannel ( ) ;
    // set monitor thread priority.
    BOOL SetThreadPriority(int npriority =
THREAD_PRIORITY_NORMAL) ;
    // Start a thread to do checking of channel.
    BOOL StartThread( ) ;
    // stop the thread . . . manual checking from now on.
    BOOL StopThread( ) ;
    // Close the channel. This sends a cancel to the
    // server to purge the channel's data quickly
    // (bitmap). If fLastClose==TRUE, it completely
    // removes the channel from the server. If
    // fLastClose==FALSE, the channel can be Restarted.
    BOOL Close(BOOL fLastClose=FALSE) ;
    // Restart the channel after a Close.
    BOOL Restart( ) ;
    DWORD WaitForData(DWORD dwTimeout = 0, LPVOID
lpHandlerData=NULL, BOOL fWaitTillNoMore = FALSE) ;
    // wait till data comes in.
    DWORD ProcessData(DWORD dwTimeout = 0, LPVOID
lpHandlerData=NULL) ;
    // takes care of looping on buffer data and call
    // handler.
    // Change the handler of the channel
    CHANNEL_HANDLER SetHandler(CHANNEL_HANDLER
pfHandler) ;
    // Returns the fChannelOK flag
    BOOL fvalid( ) ;
    // To lock/unlock/purge a channel.
    BOOL DataLock(DWORD fFlags) ;
} ;
```

Upon receiving the media items from the channels at the client viewing station 54, the client-side binaries 74 store the media items into separate cache cells. The following Table 2 illustrates code utilized in the preferred embodiment for caching picture items received on the bitmap channel.

TABLE 2

Classes for Caching Picture Items.

```
class CPicList ;
class CPicture
{
friend CPicList ;
private:
    // This name is the name of the mediaview subfile of
    // a picture, as it is requested from the server.
    LPSTR m_szName ;
    // ID under which the picture is known on the server
    // while it is sent. This ID is tagged to the
    // picture's packets of information when sent
    // through the bitmap channel.
    DWORD m_dwPicID ;
    // The mediaview title & file system handles
    // containing the picture.
    HANDLE m_hTitle ;
    HANDLE m_hfs ;
    // A list of windows that are displaying this
    // picture. When a new packet of picture data
    // arrives, the windows will be notified of it so
    // that they can update themselves.
    CWinList wl ;
    // If server has analyzed the picture we get its
    // type and dimension & data size.
    WORD      wType ;
    DWORD     dwWidth ;
    DWORD     dwHeight ;
    // Set to true if above information is was obtained
    // from the server.
    BOOL m_fHasInfo ;
    // The buffer containing the picture's bits.
    LPBYTE m_lpData ;
    // The total amount of data of the picture.
    DWORD m_dwTotalSize ;
    // How much of the picture we already got.
    DWORD m_dwSize ;
    // This flag is TRUE if the whole picture has
    // arrived.
    BOOL m_fComplete ;
    // This tells us if picture needs to be sent all at
    // once or if it's ok to have it downloaded
    // in parallel with other pictures.
    BOOL m_fWholething ;
public:
    // Create a picture cell & link it to the next
    // picture passed as argument.
    CPicture(HANDLE hTitle, BOOL f, LPSTR sz, CPicture*
&pNextPicture, HFS hfs = NULL) ;
    // Deletes the data associated with the cell
    ~CPicture( ) ;
    // Sets the picture's data size once it's known, and
    // allocate the proper amount of memory for the
    // buffer.
    void SetSize(DWORD dwTotalSize) ;
    // Called when receiving the data size, dimensions
    // and type of the picture from the information
    // channel.
    void SetInfo(FileInfoStruct & fis) ;
    // Copies a new chunk of picture data into the
    // picture's buffer, then have all child windows
    // updated. The data came from the bitmap channel.
    void LoadData(DWORD dwOffset, LPBYTE lp, DWORD
dwSize)
    // Called to update the amount of picture data
    // downloaded so far. If a picture just completed
    // its download, we will check our list of pictures
    // to try to start background task downloads of
    // other pictures.
    void UpdateStatus(DWORD dwSize)
    // Attaches a new child window to the cell.
    // If the picture was already being downloaded, it's
    // just adding one child to the list, and keeps
    // going. If the picture is not already being
```

TABLE 2-continued

Classes for Caching Picture Items.

```
    // downloaded, the server is called for the
    // download. If a previous download has taken
    // place, only the missing part is requested.
    CPicture * Activate(HWND hWnd) ;
    // Removes a window from the list of child windows.
    void Deactivate(HWND hWnd) ;
    // Allows clients of this class to check how much
    // data we got for the picture.
    BOOL GetStatus(LPBYTE &lpBuf, DWORD &dwSize, DWORD
&dwTotalSize) ;
    // Allows clients of this class to query what type
    // of picture this is, and what dimensions it has
    GetInfo(BOOL &_fAnalyse, WORD &_wType, DWORD
&_biWidth, DWORD &_biHeight) ;
} ;
// List class to manage the picture cells
// It derives from CMyList, a generic linked list
// implementation.
class CPicList : public CMyList
{
    // Lookup in list of existing pictures. Lookup by
    // number ID of the picture.
    CPicture * FindPicture(DWORD dwPicID)
    // Lookup in list of existing pictures. Lookup by
    // name and file system.
    CPicture * FindPicture(LPSTR sz, HFS h)
    // Checks each cached picture to see if it is being
    // downloaded. If it is, set a flag saying it was.
    // We want to shut off the pictures before doing the
    // layout of topic, to ensure it will not be
    // delayed. Returns the number of pictures that
    // were being downloaded.
    DWORD AsphyxiatePictures ( )
    // Goes through all pictures in cache and checks if
    // they need to be resuscitated. The list of
    // pictures to restart is shipped to the server in
    // one call using a tip of tPictureRequests type.
    // We want to bring up the picture downloads after
    // the layout of a topic is complete.
    DWORD ResuscitatePictures(BOOL fDoSequencePic =
FALSE)
} ;
```

Process for Anticipating Media Item Requests

Referring now to FIG. 3, the server-side binaries 70 in the preferred embodiment implement a process 80 to anticipate which media items are likely to be requested next by the viewer application 60. To predict which media items are likely to be requested by the viewer application 60, the server-side binaries 70 rely on the structure of a topic in the title that the user selects for presentation by the viewer application 60 and on the order in which media items associated with a selected topic are requested by the viewer application 60.

In general, when a user activates a hot-spot that causes a jump to another topic in a pane, the viewer application 60 converts the topic's name to a virtual address of the topic by first calculating a hash code on the topic's name, then calling a service of the binaries 70, 74 to convert the hash code to a virtual address. The following Table 3 illustrates code utilized in the viewer application 60 of the preferred embodiment for requesting conversion of a topic name.

TABLE 3

Code for Converting Jump Hash Code to Virtual Address.

```
DWORD vaConvertHash(HTITLE hTitle, HASH hash)
{
    DWORD   va = vaNil;       // Failure by default.
    // Verify validity of input parameters.
    if(!pcb || !hash)
        return va;
    // Get access to cached information about the
    // multimedia title.
    CACHE_BLOCK    *pcb = (CACHE_BLOCK *)hTitle ;
    // Setup variables to control how long we will wait.
    DWORD dwStartTime = GetTickCount( ) ;
    DWORD dwLastAsked = dwStartTime -
MOSVIEWER_METHOD_TIMEOUT;
    // Look up the cache of va's for the translation
    // of hash. If it is found, tVAddrInCache returns
    // TRUE and updates va by reference. If not, the
    // while block is entered.
    while (!fVAddrInCache (hash, pcb->bLineHTitle, va))
    {
        // Leave loop if connection died . . .
        if (!fConnectionOK ( ))
            break ;
        // . . . or if we've been waiting too long.
        if (GetTickCount( ) - dwStartTime >
MOSVIEWER_METHOD_TIMEOUT)
            break ;
        // If too much time elapsed since we last asked,
        // call the server again.
        if (GetTickCount( ) - dwLastAsked > 4000)
        {
            // This shuts off any outstanding picture
            // downloads to give us priority. They will
            // be restarted later once the high-priority
            // items are all arrived.
            StartHighPriority ( ) ;
            // Tell the server - asynchronously - what
            // we want.
            IMosMethod * pmpcvaConvertHash ;
            HRESULT hr = psrvViewerMpc-
>CreateMethodInstance(smvaConvertHash,
&pmpcvaConvertHash) ;
            if (FAILED (hr))
                return va ;
            pmpcvaConvertHash->AddParam((BYTE) pcb-
>bLineHTitle ) ;
            pmpcvaConvertHash->AddParam((DWORD)hash ) ;
            IMosStatus * pms ;
            hr = pmpcvaConvertHash->Execute(&pms) ;
            pmpcvaConvertHash->Release( ) ;
            if (FAILED(hr))
                return va ;
            pms->Release( ) ;
            // Keep track of when we last called the
            // server
            dwLastAsked = GetTickCount( ) ;
        }
        // If the converted data arrived, it is in the
        // Information channel. The data in the channel
        // is process and placed in the cache that
        // fvAddrInCache will look up.
        ProcessChannel (I_CHANNEL,
MOSVIEWER_METHOD_TIMEOUT/4, NULL, FALSE) ;
    }
    return va;
}
```

The viewer application 60 then requests and lays out sufficient of the media items associated with the topic to fill the pane. For each textual item (e.g., paragraph) of the topic which is necessary to fill the pane, in order, the viewer application 60 requests the textual item, request the dimensions of any picture items embedded in the textual item, and queues requests for the embedded picture items (if any). The queued requests for picture items will be processed at the client viewing station 54 after the client application 60 completes the lay-out of the pane. After the pane is full, the viewer application 60 runs the topic's on-entry macro, which may contain instructions to trigger jumps to other topics in secondary panes. The viewer application then proceeds to request the items for these other topics. Accordingly, when a request to convert a topic name to a virtual address is received from the client viewing station 54 in the process 80, the server-side binaries 70 anticipate that the viewer application 60 will next request media items associated with the converted topic in this same order.

In a first step 81 of the process 80, the server-side wrappers 72 receive an API call of the viewer application 60 to convert a character string associated with a selected topic to the topic's virtual address. At a step 82, the server-side wrappers 72 pass this API call to a service in the server-side binaries 70 which converts the string to the selected topic's virtual address. The service transmits the virtual address to the client viewing station 54 on the information channel over the on-line connection 56 at a step 83. This initial transfer typically ends up being a synchronous transfer because the viewer application 60 must wait for the topic's virtual address to arrive before the viewer application can continue further processing of the user's action (e.g., by requesting media items or laying out the media items in the pane).

Next, the server-side binaries 70 begin anticipatory asynchronous transfers of media items associated with the selected topic in a loop of steps 84–89. At step 84 in the loop, the server-side binaries 70 retrieve a next textual item (paragraph) of the selected topic from the storage device 68 at the data center server 52. The server-side binaries 70 transmit this textual item over the on-line connection 56 on the full context channel at step 85.

The server-side binaries 70 next checks for any on-entry macro in the textual item for instructions which would trigger further media item requests by the viewer application 60. For example, the on-entry macro may include an instruction to jump to other topics in secondary panes. At step 85, the server-side binaries 70 asynchronously transfer the on-entry macro over the on-line connection with the textual item on the full context channel. At step 86, the server-side binaries 70 further asynchronously transmit media items required for the instructions in the on-entry macro. For an instruction to jump to another topic in a secondary pane for example, the server-side binaries 70 recursively repeat the steps 82–89 for that other topic.

In the preferred embodiment, the server side binaries 70 further anticipate viewer application requests based on a set of additional macros which may be included in the textual items of the topics by the author of the multiple media title. These macros act as hint items which provide "hints" as to likely next media item requests. Other than the PaneID, JumpID, and PopupID macros, the macros described in the following paragraphs are in addition to those available in the prior Microsoft Multimedia Viewer version 2.0.

PaneID, JumpID, PopupID are conventional Microsoft Multimedia Viewer version 2.0 macros that the server-side binaries 70 analyze to anticipate what the user may choose to view in the title.

A PreloadID ("topic1", "topic2", . . . , "topicN") macro is included in a title to indicate a set of preload topics that are likely jumps to be activated by the user. When this macro is found in a topic currently being transmitted, the preload topics indicated by the macro are transmitted by the server-side binaries 70 immediately after the topic currently being downloaded. This results in near instantaneous response time to user activation of one of the jumps, provided that the media items for the activated jump had enough time to arrive before activation by the user.

A PreloadPic ("pic1", "pic2", . . . , "picN") macro is included in a topic for the multiple media title author to indicate which picture items are used in the topic. In response to this macro, the server-side binaries 70 transmit the dimensions of the items in advance.

A SequencePic ("pic1", "pic2", . . . , "picN") macro is included in a topic to specify pictures that should be asynchronously transmitted as a background task. This can be used to download the pictures of the next topic while the user is reading a long piece of text.

The server-side binaries 70 further checks for any embedded picture items referenced in the textual item as shown at step 87. At steps 88, the server-side binaries 70 transmit the dimensions of these picture items on the information channel.

As shown at step 89, the server-side binaries 70 continue to transmit the paragraphs or textual items of the selected topic in order until a total of 3 Kbytes of textual item data has been transmitted (which is generally sufficient to fill a pane), or all textual items associated with the topic are transmitted. If 3 Kbytes of textual item data has not yet been transmitted and more textual items remain, the server-side binaries 70 repeat the loop 84–89 for the next textual item of the topic in order. If all of the topic's textual items or a total of 3 Kbytes of textual items have been transferred, the process 80 ends at step 90.

Referring to FIG. 4, transfer of pictures is implemented in a separate process 100 by the server-side binaries 70. As shown at step 102 at a start 101 of the process 100, the process 100 begins when the datacenter server 52 receives a list of pictures for transfer in an API call from the client viewing station 54. Alternatively, the process 100 can be initiated from within the process 80 in anticipation of the API call. To avoid delaying the transfer of textual items for each of the panes affected by a jump however, transfer of pictures is deferred in the preferred embodiment until requested from the client viewing station. In response to the remote API call, the server-side binaries 70 transfer the requested picture item or items over the on-line connection 56 on the bitmap channel at step 103. After completion of the transfer, the process 100 ends.

Tip Message API

In the preferred embodiment of the invention, the binaries 70, 74 and wrappers 72, 76 implement an API (referred to as the "MVTitlePreNotify" API in the preferred embodiment) which allows the viewer application 60 to send a message that "tips" the data center server 52 on what the viewer application 60 is about to request. This provides a further mechanism for the server-side binaries 70 to predict which media items will be requested next by the viewer application 60. The tip messages are enumerated by the code in the following Table 4.

TABLE 4

Enumeration of Tip Messages.

```
enum TipList
{
    // Passes an array of wordwheel indexes of which
    // we want the associated text.
    tPreloadWordWheel,
    // Passes an array of hash codes of which we
    // want the corresponding virtual addresses.
    tJumpHash,
    // Passes an array of topic numbers of which we
    // want the corresponding virtual addresses. The
    // topic is 0.
    tPreloadTopicArray,
```

TABLE 4-continued

Enumeration of Tip Messages.

```
        // Passes an array of ADDR structures of which
        // we want the corresponding virtual addresses.
        tPreloadAddrArray
        // Passes a set of picture names of which we
        // want the dimensions in order to prepare the
        // page's layout.
        tPicturePreload,
        // Schedules the downloads of a set of pictures,
        // providing status information on how much we
        // already got of the pictures and what's the
        // pictures' IDs to send back. Also tells if we
        // want the pictures interspersed or sent as
        // whole.
        tPictureRequests,
    } ;
```

In response to a call to this API, the server-side binaries 70 begin asynchronously transmitting the media items identified in the tip message. The server-side binaries 70 preferably also predict, based on the media items identified in the tip message, any additional media items which the viewer application is likely to request next. For example, when a word wheel is presented in a title, the viewer application 60 requests word items of the word wheel to be presented in a pane one at a time. With the tip message API, the viewer application 60 can instead transmit the tPreloadWordWheel tip message to identify an array of indexes corresponding to a set of word items in the word wheel to be transmitted by the server-side binaries 70 in advance. The word items are then available in the cache storage at the client viewing station 54 when each word item would otherwise be requested individually.

In cases where the viewer application 60 instead requests a single word item of a word wheel, the server-side binaries 70 anticipatorily transmit word items at indexes in the word wheel near the index of the requested word item.

Protected Mode Transfer API

In the preferred embodiment of the invention, the binaries 70, 74 and wrappers 72, 76 further implement an API service (referred to as the "MVTitleNotifyLayout" API in the preferred embodiment) which the viewer application calls to signal the beginning and end of critical transfers, such as for transfers of layout information items, word items for word wheels, search result items, and the like. By calling this API before and after a critical transfer, the viewer application can reduce the latency of a requested transfer. In general, the transport layer of the on-line connection 56 attempts to keep sufficient information for up to approximately 1–3 seconds of transmission time queued for transmission over the on-line connection 56 to increase the utilization of the on-line connection bandwidth. When picture items are being transmitted on the bitmap channel, this queued information tends to reach its maximum size. The MVTitleNotifyLayout API allows a critical transfer to bypass this full condition of the queued information and thereby reduce the latency that would otherwise delay the transfer.

In response to a call to the MVTitleNotifyLayout API from the client viewing station 54, a service in the server-side binaries 70 pauses asynchronous transmission of picture items and purges the bitmap channel (which cancels data of picture items in transit through various gateways of the on-line connection 56). The viewer application can then follow the MVTitleNotifyLayout API call with a call requesting transfer of the critical item. The critical items then have all latitude to arrive as fast as possible over the cleared on-line connection while in this "protected mode" condition where queued picture items are not clogging the on-line connection. In the preferred embodiment, calls to this API can be nested. When all nested protected mode transfers are exited as signaled by calls to the API at completion of each critical transfer, the service resumes transmission of the purged picture items.

Having described and illustrated the principles of our invention with reference to a preferred embodiment, it will be recognized that the preferred embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the preferred embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a distributed computer network comprising a remote multiple media content server and a client viewing station in communication via a wide-area connection, a method of viewing at the client viewing station a multiple media title stored at said server and containing a plurality of topics associated with multiple media items, the method comprising the steps of:

receiving at said server a first request by the client viewing station for data relating to a selected one of the topics contained in the multiple media title;

determining from multiple media items associated with the selected topic and responsive to the first request which of the multiple media items of the topic are likely to be requested next by the client viewing station;

transferring from said server to the client viewing station of said multiple media items determined as likely to be requested next; and caching said transferred multiple media items in a cache storage at the client viewing station whereby said multiple media items are available without requesting from said server when rendering a presentation of at least a portion of the topic at the client viewing station.

2. The method of claim 1 comprising:

checking by the client viewing station for the presence in the cache storage of multiple media items needed for rendering the presentation at the client viewing station without the client viewing station having previously requested the multiple media items; and retrieving from the cache storage by the client viewing station any said multiple media items needed for rendering the presentation and present in the cache storage.

3. The method of claim 1 wherein said step of determining is performed at said server in response to the client viewing station requesting an address datum relating to the topic.

4. The method of claim 1 wherein the wide-area connection is capable of multiple channel communication and said transferred multiple media items comprise a bitmap image element having associated dimension data, and the method comprises:

transferring the bitmap image element and the dimension data from said server to the client viewing station in separate channels.

5. The method of claim 4 wherein said transferred multiple media items further comprise a textual element, and the method comprises:

transferring the bitmap image element and the textual element from said server to the client viewing station in separate channels.

6. The method of claim 1 wherein the wide-area connection is capable of multiple channel communication, and further comprising the steps of:

transferring at least some of the multiple media elements concurrently from said server to the client viewing station in separate channels;

transmitting by the client viewing station to said server of a request for transfer of a multiple media item in a protected mode;

pausing the transferring of said at least some multiple media items on the separate channels responsive to the request;

transferring said requested multiple media item from said server to the client viewing station; and resuming the transferring of the at least some multiple media items after completion of the transferring of said requested multiple media item.

7. In a distributed computer network comprising a remote multiple media content server and a client viewing station in communication via a wide-area connection, the client and server having a pre-established protocol for transferring items, a method of viewing at the client viewing station a multiple media title stored at said server and containing a plurality of topics associated with multiple media items, the method comprising the steps of:

transmitting by the client viewing station of a tip message relating to multiple media items that are to be requested next by the client viewing station;

transferring from said server to the client viewing station of said multiple media items that are to be requested next by the client viewing station without using the pre-established protocol;

caching said transferred multiple media items in a cache storage at the client viewing station whereby said multiple media items are available before required by the client when rendering a presentation of at least a portion of the topic at the client viewing station.

8. The method of claim 7 wherein said multiple media items that are to be requested next by the client viewing station include address data of selected topics.

9. The method of claim 7 wherein said multiple media items that are to be requested next by the client viewing station include bitmap image elements.

10. The method of claim 7 wherein said multiple media items that are to be requested next by the client viewing station include word items.

11. The method of claim 1 wherein the topic contains hint items relating to which multiple media items are likely to be requested next by the client viewing station.

12. In a computer network comprising a client viewing station remotely connected via a modem to a server having a database containing at least one multiple media title each having a plurality of topics, a method of viewing a multiple media title at the client viewing station comprising the steps of:

activating by the user of a hot-spot in the multiple media title to initiate a jump to a selected topic of said title;

transmitting by the client viewing station to the server an initial transfer request for transfer of an initial item associated with the selected topic in the database;

determining from information in the selected topic and responsive to the initial transfer request which additional multiple media content and layout information associated with said topic is likely to be further requested;

transferring the initial item and the additional multiple media content and layout information determined as likely to be further requested by the server to the client viewing station responsive to the initial transfer request;

caching said transferred multiple media content and layout information associated with the selected topic at the client viewing station;

retrieving by the client viewing station of multiple media content and layout information required for display of a next portion of the selected topic in a pane, the step of retrieving said required multiple media content and layout information comprising the steps of:

for each piece of said required multiple media content and layout information, checking for the presence of said piece in said cached multiple media content and layout information at the client viewing station;

retrieving said piece from said cached multiple media content and layout information if said piece is present in said cached multiple media content and layout information; and requesting transfer of said piece from the server if said piece is not present in said cached multiple media content and layout information.

13. The method of claim 12 wherein the step of transferring comprises transferring the multiple media content and layout information associated with the selected topic in the database in multiple separate channels.

14. The method of claim 13 wherein the channels comprise a bitmap channel, a full context channel, a word wheel channel, a highlights channel, and an information channel.

15. The method of claim 12 wherein the step of retrieving by the client viewing station of said required multiple media content and layout information comprises requesting said required multiple media content and layout information in asynchronous transfer operations from the server.

16. The method of claim 12 comprising, responsive to a request for an item in the selected topic:

checking an entry macro of the selected topic for instructions to jump to an additional topic in a secondary pane;

transferring by the server to the client viewing station of multiple media content and layout information associated with the additional topic in the database without request from the client viewing station; and caching said transferred multiple media content and layout information associated with the additional topic at the client viewing station.

17. The method of claim 12 wherein transmitting the initial request comprises:

transmitting by the client viewing station to the server a conversion request to convert the selected topic to a virtual address associated with the selected topic at the server station.

18. A multiple media viewing system comprising:

a server station having storage for a multiple media title containing a plurality of topics, each topic being associated with media content in the database including at least textual items and image items;

a client viewing station remotely connected to the server;

a multiple media viewer executing on the client viewing station for rendering the title by a user at the client viewing station, the multiple media viewer being responsive to user input to transmit a first request to the server station for media content associated with a selected topic of the title for presentation to the user;

a data transfer service executing on the server station and operative responsive to the first request to anticipate additional media content likely to be requested by the multiple media viewer and to transfer the additional media content to the client viewing station;

a cache storage at the client viewing station for caching the additional media content transferred by the data transfer service; and the multiple media viewer being operative to check for the presence in the cache storage of an item of media content to be presented to the user, and to transmit a second request to the server station for the item if the item is absent from the cache storage.

19. The multiple media viewing system of claim 18 comprising:

a transporter for transferring multiple items of the media content concurrently on multiple separate channels from the server station to the client viewing station.

20. The multiple media viewing system of claim 19 wherein said channels comprise a first channel for transferring the image items of the media content, a second channel for transferring the textual items of the media content, and a third channel for transferring dimensions of the image items.

21. The multiple media viewing system of claim 20 wherein said channels further comprise a fourth channel for transferring word items, and a fifth channel for transferring search results.

22. The multiple media viewing system of claim 19 comprising:

a protected mode transfer service executing on the server station and responsive to a call from the multiple media viewer requesting immediate protected transfer of an item for pausing transfer of the image items, for transferring the subject item of the call, and for resuming transfer of the image items on completing the transfer of the subject item of the call.

23. The multiple media viewing system of claim 18 comprising:

the multiple media viewer being operative to transmit the second request in an asynchronous transfer operation.

24. The multiple media viewing system of claim 18 comprising:

a prenotify service executing on the server station for receiving a tip message from the multiple media server relating to media content which is to be requested by the multiple media viewer, and for transferring said media content to the client viewing station.

25. The multiple media viewing system of claim 18 wherein the multiple media title contains a hint item associated with a first item of the media content and relating to a set of items of the media content likely to be requested by the multiple media viewer next after a request for the first item.

26. A computer-readable medium having computer-executable instructions for performing the steps recited in claim 1.

27. A computer-readable medium having computer-executable instructions for performing the steps recited in claim 6.

28. A computer-readable medium having computer-executable instructions for performing the steps recited in claim 7.

29. A computer-readable medium having computer-executable instructions for performing the steps recited in claim 11.

30. A computer-readable medium having computer-executable instructions for performing the steps recited in claim 18.

31. In a distributed computer network comprising a remote multiple media content server and a client viewing station in communication via a wide-area connection, a method of viewing at the client viewing station a multiple media title stored at said server and containing a plurality of topics associated with multiple media items, the method comprising the steps of:

receiving at said server a current request by the client viewing station for multiple media items relating to a selected one of the topics contained in the multiple media title;

determining at said server from multiple media items associated with the selected topic and responsive to the current request which of the multiple media items of the topic are likely to be requested further by the client;

transferring from said server to the client viewing station of said multiple media items determined as likely to be requested further; and caching said transferred multiple media items in a cache storage at the client viewing station whereby said multiple media items are available at the client without requesting from said server when rendering a presentation of at least a portion of the topic at the client viewing station.

32. The method of claim 31 wherein said step of determining comprises:

checking the topic for a hint item relating to the current request to determine which of the multiple media items of the topic are likely to be requested further after the current request by the client.

33. The method of claim 1 wherein said step of determining comprises:

checking the selected topic for hint items relating to which multiple media items are likely to be requested next after the first request by the client viewing station.

34. In a distributed computer network comprising a remote multiple media content server and a client viewing station in communication via a wide-area connection, a method of viewing at the client viewing station a multiple media title stored at said server and containing a plurality of topics associated with multiple media items, at least one of said topics containing at least one hint item relating to which items are likely to be requested further by the client viewing station, the method comprising the steps of:

receiving at said server a first request by the client viewing station for a multiple media item relating to a selected one of the topics contained in the multiple media title;

checking the topic at said server for a hint item relating to said multiple media item;

determining at said server from said hint item which of the multiple media items of the topic are likely to be requested further after the first request by the client;

transferring from said server to the client viewing station of said multiple media items likely to be requested further; and caching said transferred multiple media items in a cache storage at the client viewing station whereby said multiple media items are available at the client without requesting from said server when rendering a presentation of at least a portion of the topic at the client viewing station.

35. In a distributed computer network comprising a remote multiple media content server and a client viewing station in communication via a wide-area connection, the client and server having a pre-established protocol for transferring items, a method of viewing at the client viewing station a multiple media title stored at said server and containing a plurality of topics associated with multiple media items, the method comprising the steps of:

transmitting by the client viewing station of a tip message relating to multiple media items that are to be requested next by the client viewing station according to the pre-established protocol;

determining responsive to said tip message which of the multiple media items of the topic are likely to be requested further by the client;

transferring from said server to the client viewing station of said multiple media items likely to be requested further by the client viewing station;

caching said transferred multiple media items in a cache storage at the client viewing station whereby said multiple media items are available at the client viewing station when the client viewing station would otherwise request the items according to the pre-established protocol.

36. In a distributed computer network comprising a remote multiple media content server and a client viewing station in communication via a wide-area connection, the client and server having a pre-established protocol for transferring items, a method of viewing at the client viewing station a multiple media title stored at said server and containing a plurality of topics associated with multiple media items, the method comprising the steps of:

transmitting by the client viewing station to the server a current request for multiple media items relating to a selected one of the topics contained in the multiple media title;

determining at the server which of the multiple media items are likely to be requested further by the client according to an order of the multiple media items occurring in the selected topic and according to an order in which the client requests items, wherein the client request order is contained in the pre-established protocol for transferring items;

transferring from the server to the client viewing station the multiple media items determined likely to be requested further by the client viewing station;

caching the transferred multiple media items in a cache storage at the client viewing station whereby the transferred multiple media items are available at the client viewing station when the client viewing station would otherwise request the items according to the pre-established protocol.

37. A computer-readable medium having computer-executable instructions for performing the steps recited in claim 36.

* * * * *